US012770474B2

(12) United States Patent
Turner et al.

(10) Patent No.: US 12,770,474 B2
(45) Date of Patent: Oct. 20, 2026

(54) FIXTURE SPECIFIC MODELS FOR BET SIMULATIONS AND PRICING OF REAL TIME EVENTS

(71) Applicant: DK Crown Holdings Inc., Boston, MA (US)

(72) Inventors: Henry Charles Maurice Turner, London (GB); Joshua James Lee, Harpenden (GB); Barnaby Brien, Oxshott (GB)

(73) Assignee: DK Crown Holdings Inc., Boston, MA (US)

(*) Notice: Subject to any disclaimer, the term of this patent is extended or adjusted under 35 U.S.C. 154(b) by 161 days.

(21) Appl. No.: 18/673,623

(22) Filed: May 24, 2024

(65) Prior Publication Data

US 2025/0363856 A1 Nov. 27, 2025

(51) Int. Cl.
*G07F 17/32* (2006.01)
*G06N 20/00* (2019.01)
*G06Q 50/34* (2012.01)

(52) U.S. Cl.
CPC ......... *G07F 17/3288* (2013.01); *G06Q 50/34* (2013.01); *G07F 17/3225* (2013.01); *G07F 17/3267* (2013.01); *G06N 20/00* (2019.01)

(58) Field of Classification Search
CPC ...... G06Q 50/34; G07F 17/3244–3258; G07F 17/3288
See application file for complete search history.

(56) References Cited

U.S. PATENT DOCUMENTS

| | | | | |
|---|---|---|---|---|
| 11,455,536 | B1 * | 9/2022 | Thomas | G06N 3/0464 |
| 2017/0140605 | A1 * | 5/2017 | Lewski | G07F 17/3288 |
| 2019/0392684 | A1 * | 12/2019 | McDonald | G06N 3/044 |
| 2020/0111325 | A1 * | 4/2020 | Lockton | G07F 17/323 |
| 2021/0142624 | A1 * | 5/2021 | Chow | G07F 17/3288 |
| 2023/0162314 | A1 * | 5/2023 | Darcy | G06Q 50/34 463/16 |
| 2024/0070770 | A1 * | 2/2024 | Marko | G07F 17/3288 |
| 2024/0370889 | A1 * | 11/2024 | Back | G06Q 50/34 |
| 2025/0209891 | A1 * | 6/2025 | Jacquet | G06N 3/084 |

* cited by examiner

*Primary Examiner* — Jay Huang
(74) *Attorney, Agent, or Firm* — Wash Park IP Ltd.; John T Kennedy

(57) ABSTRACT

Devices, systems, and process for generating fixture specific models for use in adjusting pricing of real-time betting lines are described. A system may include a front-end system including an event-activity-fixture (EAF) server that adjusts betting lines based on results of simulations generated by an EAF simulation server (EAFSS). The EAFSS generates the simulations using fixture specific models that have been generated based upon adaptations of generic models, where the adaptations occurring using historic and real-time EAF data and fixture specific modeling data. The fixture specific models adapted from one or more generic models are leveled and stored in a database for use by the EAFSS on a real-time basis as the EAF occurs. A server for adapting the generic models instantiate one or more computer engines including a model adaptation engine, a generic modeling engine, an EAF data engine, and an FSM leveling engine.

14 Claims, 4 Drawing Sheets

FIXTURE SPECIFIC MODELS FOR BET SIMULATIONS AND PRICING OF REAL TIME EVENTS

TECHNICAL FIELD

The technology described herein generally relates to devices, systems, and processes for adjusting market pricing by player for mainline handicap and over/under bets for sporting events. More specifically, the technology described herein generally relates to the development and use of fixture specific models used in massive real-time simulations to determine pricing for bets on real-time events.

BACKGROUND

An online gaming system ("OGS") commonly utilizes a combination of one or more gaming servers (herein, a "front-end system (FES)"—as further described below) that receive data feeds from one or more third party servers (herein, each a "back-end system (BES)"—as further described below), such as SWISH™ data provided by Swish Analytics of San Francisco, California, USA and Sportradar of St. Gallen, Switzerland. The FES commonly facilitates betting by bettors (herein, each being a "user" and as defined herein) on one or more "events" (as defined herein) and may include live events and future vents. The FES uses data provided by the BES.

An event may include one or more "activities" (as defined herein) with respect to which bets may be placed. Further, a FES may allow a user to place same game parlay ("SGP") bets wherein bets are placed on multiple future activities occurring. For example, an SGP may include bets on total points scored and total assists in a given event. Today, data is provided by the BES which the FES uses to determine odds, pricing, and results for activities, SGPs, and other forms of bets.

Further, an event typically includes one or more "event entities" (herein, each a "player") that participate in the event and/or an event activity. Non-limiting examples of players include a team, an individual participant on a team, a collection of participants on a team (e.g., an NFL defensive squad), a coach of a team, or otherwise. Event activities, such as scoring activities, may be attributed to one or more players. A player's activities may be further identified in a player props line (a "Props"). For example, a player's scoring activity may be identified as an over/under of a given point total in a Props. For a further example, a Props may identify a player scoring greater (over) or less (under) twenty points in a game. Bets may be placed in view of the odds, other users' bets, statistical results, and other data of the player so scoring over or under the given total.

The player's activities may be further attributed to various team categories that collectively contribute to the overall performance of a team of players for one or more given events and/or one or more given activities. For example, player A may score a basket and thereby contribute points to a team's overall score, while player B provides an assist that results in the basket being scored. Collectively, player activities may result in adjustments to team activities.

Commonly, a FES will provide users with various team-based betting options and various SGP player betting options. For example, a team-based betting option may be generated based on a first team model while an SGP player betting option may be generated based on a second Props model. While both models may consider total points scored by a given player by quarter, overall, or otherwise (e.g., a scoring activity by a basketball team may occur by a first player or another player), and while data regarding team-based event activities and Props is commonly readily available, correlations, and systems and methods for generating such correlations, of an individual player's contributions to the team-based event activities are needed for pricing of real-time betting lines, such as SGPs, which may include real-time SGPs ("RSGPs").

During an event, betting lines are commonly determined based upon generic models. The models may be event, event-activity, or otherwise specified. Typically, the generic models do not account for fixtures (as defined below) occurring with regards to a particular type of an event and/or an event-activity. For example, an event may be a baseball game, an activity may be an inning in the game, and a fixture may be a particular then occurring or later occurring pitcher/batter match-up. Generic models commonly do not account for the given pitcher/batter match-up and accordingly a betting line is typically generated based on one or more generic models that can be associated with a higher level of abstraction such as on an event level (e.g., a baseball game) and/or an activity level (e.g., a half-inning of a baseball game) and without consideration of specific elements of the event-activity, as identified by one or more fixtures thereof.

Further, use of fixture specific models have been proposed in the past, current systems are commonly limited in their processing power and speed and are incapable of generating models for a given fixture on a substantially real time (as defined herein) basis. Thus, gaming system commonly use generic models in the numerous (often thousands) of simulations that are used to determine a betting line, or an adjustment thereto. The generic model is not reflective of a given currently occurring fixture and the fixture data currently available during an activity and an event and thus are inherently inaccurate. Such inaccuracies commonly result in the simulations generating probability grids that contain recognizable errors. Such errors are then commonly adjusted by intervention of a gaming manager (a person or automated process) or otherwise. Such interventions are time and resource intensive and are still subject to errors which may result in betting lines that do not accurately reflect the probabilities that should actually exist for a given event—activity—fixture.

Accordingly, devices, systems and processes are needed for pricing betting lines based on real-time variations in fixtures for a given activity of a given event.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of various implementations of the present disclosure is provided in the following written description and illustrated in the accompanying drawings.

Various implementations are described of devices, systems, and processes for generating fixture specific models and utilizing such fixture specific models during real-time event simulations to generate real-time pricing for one or more betting lines where the real-time pricing accounts for one or more real-time variations in one or more fixtures for the event.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation of the present disclosure, a server may include comprising: a data store storing non-transitory first computer instructions for instantiating a model adaptation engine ("MAE"); a processor may be configured to execute the first computer instructions and instantiate the MAE. The MAE, when instantiated by the processor, may instruct the server to perform MAE operations ("MAEO") including: searching a database for fixture specific model ("FSM") data ("FSMD") pertinent to a given event-activity-fixture ("EAF"); obtaining generic model data ("GMD") for a given event-activity pairing; and modifying the GMD with the FSMD to generate FSM adapted data ("FSMAD") for the given EAF. An FSMS bus couples the processor with the data store.

For at least one implementation of the server, the data store may further store non-transitory second computer instructions for instantiating a generic modeling engine ("GME"); the processor may be further configured to execute the second computer instructions and instantiate the GME. The GME, when instantiated by the processor, may instruct the server to perform GME operations ("GMEO") including obtaining the GMD from a generic model database ("GMDB").

For at least one implementation of the server, the GMDB includes non-transitory generic models identifiable based on at least one of an event identifier and an activity identifier.

For at least one implementation of the server, at least one of the generic models has been refined using a supervised artificial intelligence and machine learning ("AI/ML"). The AI/ML may be initially trained based on past instances of an event-activity pairing and the AI/ML may be refined based on additional event-activity pairings. The GME may further perform the GMEO of obtaining the GMD from the GMDB by utilizing the AI/ML to identify, on a Cloud storage device, data pertinent to one or more event-activity pairings that are substantially similar to the given event-activity pairing.

For at least one implementation of the server, the GMEO may further include: receiving event-activity-fixture data ("EAFD") from at least one of a historical EAF database ("HEAFDB") and an EAF database ("EAFDB"); and further obtaining the generic model based on at least one of HEAF data ("HEAFD") received from the HEAFDB and RTEAF data ("RTEAFD") received from the EAFDB.

For at least one implementation of the server, the data store may further store non-transitory third computer instructions for instantiating an EAF data engine ("EAFDE"); the processor may be further configured to execute the third computer instructions and instantiate the EAFDE. The EAFDE, when instantiated by the processor, may instruct the server to perform EAFDE operations ("EAFDEO") including: requesting the HEAFD from the HEAF database; receiving the RTEAFD from a real-time data server ("RTDS"); and providing at least one of the HEAFD and the RTEAFD to the MAE.

For at least one implementation of the server, the data store may further store non-transitory fourth computer instructions for instantiating an FSM leveling engine ("FSMLE"); the processor may be further configured to execute the fourth computer instructions and instantiate the FSMLE. The FSMLE, when instantiated by the processor, may instruct the server to perform FSMLE operations ("FSMLEO") including: receiving the FSMAD from the MAE; leveling the FSMAD received from the MAE in a relational database; and outputting leveled FSM data ("FSMLD") for storage in an FSM level database ("FSMLDB").

For at least one implementation of the server, the FSMLD stored in the FSMLDB may be utilized by a simulation server during a real time EAF to simulate one or more outcomes of the real-time EAF; and the one or more outcomes are utilized by an EAF pricing server to determine one or more betting lines for the event.

For at least one implementation of the present disclosure, a process for generating a fixture specific model ("FSM") may include: searching a database for FSM data ("FSMD") pertinent to a given event-activity-fixture ("EAF"); obtaining generic model data ("GMD") for a given event-activity pairing; and modifying the GMD with the FSMD to generate FSM adapted data ("FSMAD") for the given EAF.

For at least one implementation of the process, the GMD may be obtained from a generic model database; and the generic model database may include non-transitory generic models identifiable based on at least one of an event identifier and an activity identifier.

For at least one implementation of the process, at least one of the generic models may be refined using a supervised artificial intelligence and machine learning ("AI/ML"). The AI/ML may be initially trained based on past instances of an event-activity pairing; the AI/ML may be refined based on additional event-activity pairings; and the process may further include utilizing the AI/ML to identify, on a Cloud storage device, data pertinent to one or more event-activity pairings that are substantially similar to the given event-activity pairing.

For at least one implementation of the process, the process may include receiving event-activity-fixture data ("EAFD") from at least one of a historical EAF database ("HEAFDB") and a real-time EAF database ("EAFDB"); and further obtaining the generic model based on HEAF data ("HEAFD") received from at least one of the HEAFDB and RTEAF data ("RTEAFD") received from the EAFDB.

For at least one implementation of the process, the process may include: requesting the HEAFD from the HEAFDB; and receiving the RTEAFD from a real-time data server ("RTDS").

For at least one implementation of the process, the process may include: leveling the FSMAD in a relational database; and outputting leveled FSM data ("FSMLD") for storage in an FSM level database ("FSMLDB").

For at least one implementation of the process, the FSMLD stored in the FSMLDB may be utilized by a simulation server during a real time EAF to simulate one or more outcomes of the real-time EAF; and the one or more outcomes may be utilized by an EAF pricing server to determine one or more betting lines for the event.

For at least one implementation, a computer readable medium may non-transiently store non-transitory first computer instructions which when executed by a processor, in a server, instantiates a model adaptation engine ("MAE") that instructs the server to perform MAE operations ("MAEO") including: searching a database for fixture specific model ("FSM") data ("FSMD") pertinent to a given event-activity-fixture ("EAF"); obtaining generic model data ("GMD") for a given event-activity pairing; and modifying the GMD with the FSMD to generate FSM adapted data ("FSMAD") for the given EAF.

For at least one implementation of the computer readable medium, the computer readable medium may further store non-transitory second computer instructions which, when executed by the processor, instantiates a generic modeling engine ("GME") which may instruct the server to perform GME operations ("GMEO") including: obtaining the GMD from a generic model database ("GMDB"). The GMDB may include non-transitory generic models identifiable based on at least one of an event identifier and an activity identifier.

For at least one implementation of the computer readable medium, at least one of the generic models may be refined using a supervised artificial intelligence and machine learning ("AI/ML"); wherein the AI/ML has been initially trained based on past instances of an event-activity pairing and the AI/ML may be refined based on additional event-activity pairings. The GME may further perform the GMEOs of obtaining the GMD from the GMDB by utilizing the AI/ML to identify, on a Cloud storage device, data pertinent to one or more event-activity pairings that are substantially similar to the given event-activity pairing.

For at least one implementation of the computer readable medium, the computer readable medium may further store non-transitory third computer instructions which, when executed by the processor, instantiates an EAF data engine ("EAFDE") which instructs the server to perform EAFDE operations ("EAFDEO") including: providing event-activity-fixture data ("EAFD") to the MAE. The EAFD may be obtained from at least one of a historical EAF database ("HEAFDB") and an EAF database ("EAFDB").

For at least one implementation of the computer readable medium, the computer readable medium may further store non-transitory fourth computer instructions which, when executed by the processor, instantiates an FSM leveling engine ("FSMLE") which instructs the server to perform FSMLE operations ("FSMLEO") including: receiving the FSMAD from the MAE; leveling the FSMAD received from the MAE in a relational database; and outputting leveled FSM data ("FSMLD") for storage in an FSM level database ("FSMLDB"). The FSMLD may be utilized by a simulation server during a real time EAF to simulate one or more outcomes of the real-time EAF and the one or more outcomes may be utilized by an EAF pricing server to determine one or more betting lines for the event.

BRIEF DESCRIPTION OF THE DRAWINGS

The features, aspects, advantages, functions, modules, and components of the devices, systems, and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1:
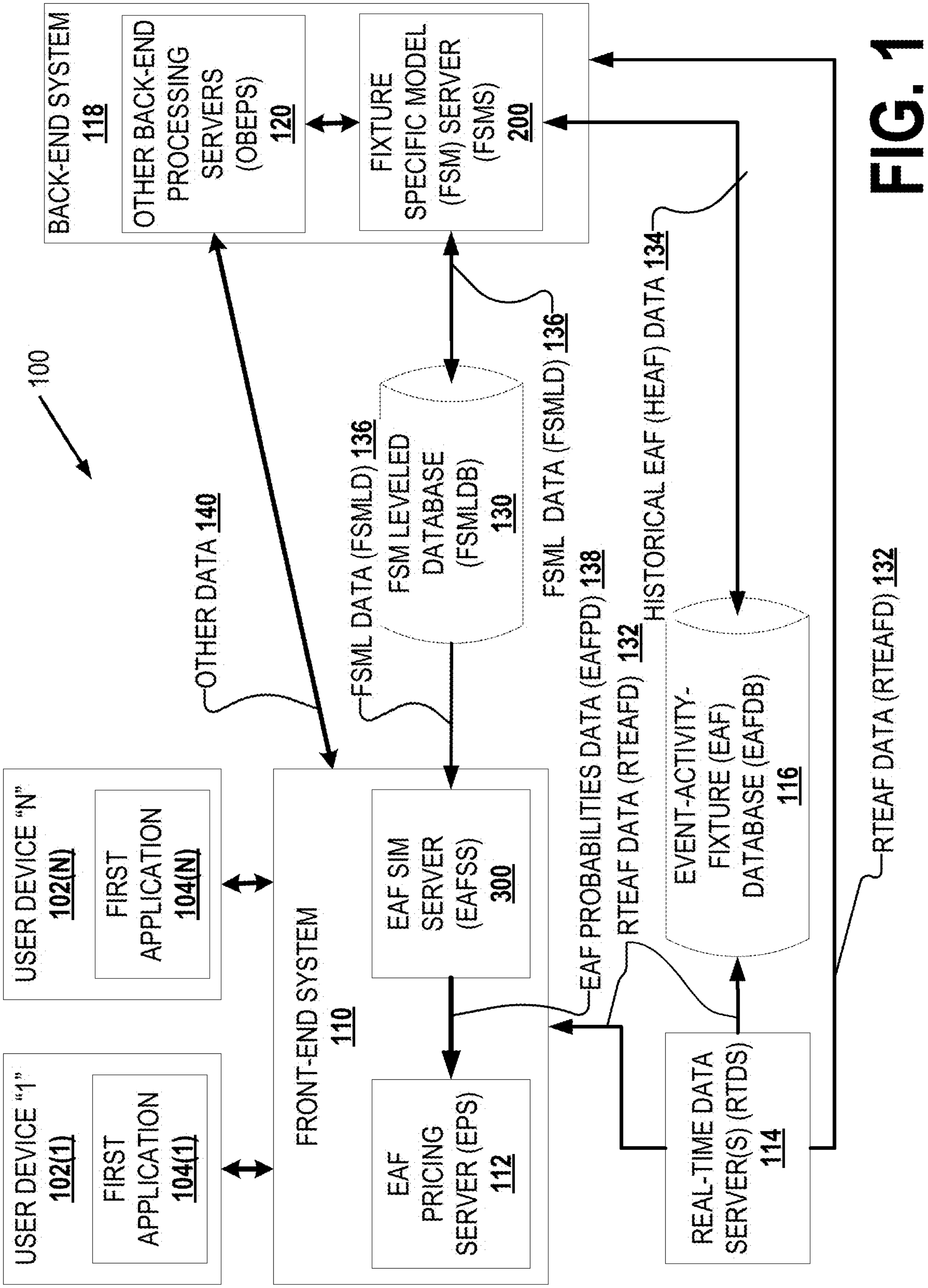
FIG. 1 is a schematic illustration of a fixture specific modeling, simulation, and pricing system for real-time betting lines and in accordance with at least one implementation of the present disclosure.

Various implementations of the present disclosure describe independent bet processing devices, systems, and processes for generating fixture responsive betting lines including, but not limited to, betting lines for on-line gaming involving SGPs and RSGPs.

For at least one implementation, a system is provided which generates, based on a fixture specific model ("FSM") and real time event-activity-fixture ("RTEAF") data, probabilities of an outcome of a real-time activity of an event. The probabilities are further utilized to determine pricing for one or more betting lines, such as a player Props line, a team activity betting line, an activity result betting line, or the like. For example, a fixture specific model may be utilized to determine, in view of real-time fixture data, probabilities of a given player (e.g., a batter in a baseball game) hitting a home run against a given pitcher. Such probabilities may be generated, using the fixture specific model, based on various instances of fixture data with non-limiting example including pitch count, past pitcher/batter results, weather, game status, or any other available data relevant to determining a probability for a given fixture of an activity and/or an event.

In accordance with the present disclosure such probabilities may be generated and reflect one or more real-time variations in one or more fixtures for a given event by using one or more of multiple pre-determined fixture specific models that feed multiple simultaneously performed and substantially real-time simulations to generate the probabilities—such probabilities further being used by event pricing systems to substantially real-time adjust odds and pricing of one or more betting lines for the given event.

"Acceptable delay" is a delay of less than a given metric. For at least one implementation, an acceptable delay in the selection, by an event simulation server, of an existing fixture specific model that has already been downloaded to a fixture specific leveled database (as described below) for a real-time event in which one or more variations in a fixture for the given real-time event have occurred is a delay of less than one millisecond (1 ms), wherein the delay may be determined from a "fixture variation time" (as defined herein). For at least one implementation, an "acceptable delay" in the use, by the event pricing server, of a fixture specific model selected for the given real-time event to update one or more betting odd when one or more fixture variations have occurred during the real-time event, is a delay of less than four hundred nanoseconds (400 ns) after the fixture variation time. For at least one implementation, a given delay may be determined based on a quantification of one or more networked communications characteristics occurring between a back-end system element and an OGS element. It is to be appreciated that such one or more networked communications characteristics may vary over time and with use thereof.

"Activity" herein refers to one or more, including multiple, quantifiable sub-parts of an event with respect to which a betting line may be established. For a non-limiting example, a baseball game (an event) may include activities such as scores, runs, balls, strikes, outs, walks, errors and the like. Such activities may exist on an event level basis (e.g., total runs scored in the game), an inning basis (e.g., strikeouts in a given half of an inning), or otherwise. For another non-limiting example, a basketball game (an event) may include activities such as points, assists, blocks, steals, turnovers and the like. The activities may be tabulated as the event occurs and an OGS will often allow a user to place bets based on various future potential event activities (e.g., the score at a particular point of time later in the basketball game). The later time may be within any given time period, such as within seconds, minutes, or otherwise. An activity may be further defined, for one or more betting purposes or otherwise, in terms of one or more fixtures (as defined herein).

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"AI/ML" (Artificial Intelligence/Machine Learning) herein refers to the use of one or more supervised learning, unsupervised learning, and/or refinement learning processes (as executed by one or more processors which may include processors associated with one or more neural networks) to perform one or more of the operations of the various computer engines described herein.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Back-end system" (BES) herein refers to one or more computer servers, data storage devices, applications, and the like which, singularly and/or cooperatively, address one or more back-end on-line gaming functions. As used herein, a "back-end online gaming function" (BEOGF) is one or more data processing operations and communications operations performed by one or more servers which facilitate the providing of fixture data, Props, results of in-game activities, and event results. A BES may include one or more servers, data stores, communications interfaces, user interfaces, security, power, busses, and related components. The BES components may be physically, logically, virtually or otherwise grouped and/or coupled to facilitate the one or more back-end on-line gaming functions including, but not limited to, those identified herein.

"Bus" herein refers to any known and/or later arising technologies which facilitate the transfer of data within and/or between devices. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating pricing of betting lines which account for changes in probabilities occurring due to fixture variations during an event. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), the KAFKA protocol, as provided by the Apache Software Foundation and as further described at https://kafka.apache.org/documentation/#introduction (the contents of which are incorporated herein by reference), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Content" herein refers to data that that may be presented, using a suitable presentation device, to a user in a humanly perceptible format. When presented to a human, the data becomes "information." Non-limiting examples of content include gaming images and graphics such as those related to bet placement, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" (which is also referred to herein as a "computer data") herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in memory, data storage device, or otherwise, the given data packet has a non-transient state. For example, and not by limitation, data may take any form including as one or more applications, content, or otherwise. Instructions, as further described herein, are a form of data.

"Data store" herein refers to any device or combinations of devices configured to store data on a temporary, permanent, non-transient, non-transitory, or other basis. A data store is also referred to herein as a "computer readable medium." A data store may store data in any form, such as electrically, magnetically, physically, optically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient and/or non-transitory data, computer instructions, or other the like may be suitably stored in a data store. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient or transitory storage of data. Permanent storage and/or temporary storage may be used to store transient, transitory, non-transient, and non-transient data with the data, while stored, being herein deemed to be non-transitory data.

"Device" and "electronic device" herein refer to any known or later arising electrical device configured to, singularly and/or in combination, communicate, manipulate, output for presentation as information to a human, process, store, or otherwise utilize data. Non-limiting examples of devices include user devices and servers.

"EAF" and "Event-Activity-Fixture" herein refer to one or more specific elements and/or combinations of elements for a given event and a given activity of the event.

"EAF data" herein refers to data that identifies one or more substantially real-time elements of an EAF. For a non-limiting example, a baseball game (an event), may include an at-bat (an activity), and a match-up of a given pitcher for a first team against a given batter for a second team (a fixture). Other elements, as represented by EAF data may include a pitch count for the current pitcher, batting statistics for the batter, past performances between the pitcher and the batter, weather conditions, game conditions (e.g., inning, score, number of outs, and the like), pitches previously thrown in the current at-bat and in past at-bats (representative of one or more tendencies of the given pitcher), and the like.

"Event" herein refers to an occurrence of a future result with respect to which data currently exists, as provided by the BES, to create odds and prices for facilitating betting on the future result. For example, an event may be a basketball game with respect to which odds of team A prevailing over team B may be generated and pricing based on such odds specified such that a user may place a bet on a future result of the event, such as the winner, the final score, or other results from the basketball game. An event may include one or more activities (as defined herein) and may be further defined in terms of one or more fixtures (as defined herein).

"Fixture" herein refers to one or more specific elements and/or combinations of elements for a particular combination of an event and an activity. A fixture may be represented by EAF data. A fixture may impact one or more probabilities utilized in pricing betting lines for a given activity and/or for pricing betting lines for a given event. Betting lines for results arising from one or more fixtures occurring with respect to one or more activities and/or one or more events may also be established in accordance with an implementation of the present disclosure.

"Fixture Variation Time" herein refers to a time at which a given element, for a given fixture, is first reported to the event simulation server. For a non-limiting example, a strike count for a given at-bat fixture between the given pitcher and the given batter may be reported to the event simulation server substantially simultaneously with an umpire calling a strike or a foul ball during the at-bat activity.

"Front-End System" (FES) herein refers to one or more user devices, servers, data storage, communications interfaces, and related components which, singularly and/or cooperatively, address one or more gaming on-line gaming functions. As used herein, a "Front-End Online gaming function" (FEOGF) is one or more data processing and/or communications operations performed by one or more user devices and/or servers which facilitate one or more of correlations of two or more activities to facilitate pricing of a given betting line. A FES may include one or more user devices, servers, data stores, communications interfaces, user interfaces, busses, and related components. The FES components may be physically, logically, virtually or otherwise grouped and/or coupled to facilitate the one or more gaming online gaming functions including, but not limited to, those identified herein.

"Instruction" (which is also referred to herein as a "computer instruction")

herein refers to a non-transitory processor executable instruction, associated data structures, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient, non-transient, transitory and/or non-transitory basis, as may arise for any given data, content and/or instruction. While the data for one or more instructions is being utilized, such use is herein deemed to occur on a non-transient and non-transitory basis.

"Live" herein when used to refer to on-line gaming, refers to a betting line that is updated during a given activity for a given event. A non-limiting example of a "live" bet is a bet placed during an NFL™ football game and before a given event activity occurs, such as a fourth and one at the goal line play. For a non-limiting example, a live bet is a bet placed after an expiration of a regular time period for the football game (the event) where the bet chooses a result (the event activity) of an upcoming coin-toss (e.g., "heads" or "tails")—the coin toss determining who gets the option to receive a kick-off of the football during an overtime period. By comparison, a non-limiting example of a non-live bet (herein, also referred to as an "independent bet") is a bet placed for an activity for a given event before the event itself begins, with the bet, for example, being placed as to the ultimate winner of the event (the winner=the event activity). As used herein, a fixture may be used in determining probabilities for betting lines used for live and independent bets.

"Module" herein refers to and, when claimed, recites definite structure for an electrical/electronic device that is configured to provide at least one feature and/or output signal and/or perform at least one function including the features, output signals and functions described herein. A module may provide the one or more functions using computer engines, processors, computer instructions and the like. When a feature, output signal and/or function is provided, in whole or in part, using a processor, one more software components may be used, and a given module may include a processor configured to execute computer instructions. A person having ordinary skill in the art (a "PHOSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the use of electrical energy by a device. Non-limiting examples of such technologies include batteries, power converters, inductive charging components, line-power components, solar power components, and otherwise.

"Processor" herein refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, multi-threaded and otherwise.

"Real-time" herein refers to, with respect to a given event and a given activity thereof, a communication of fixture data to an event simulation engine, a selection of a fixture leveled model by the event simulation engine, an execution of thousands of substantially simultaneous simulations using the selected fixture leveled model, a generation and/or updating of one or more betting lines for the given activity, and a communication of the betting lines to a user each individually and collectively occur within a time period which enables the user to review and select or reject one or more betting lines that have been initially generated and/or subsequently updated based upon Fixture data relevant to the given event and activity.

"Security Component/Security" herein refers to any known or later arising processor, computer instruction, and/or combination thereof configured to secure data as communicated, processed, stored, or otherwise manipulated. Non-limiting examples of security components include those implement encryption standards, such as an Advanced Encryption Standard (AES), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server. A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Substantially simultaneous(ly)" herein refers to an absence of a greater than expected and humanly perceptible delay between a first event or condition, such as a completion of an activity, and a second event or condition, such as a placing of a bet for a given activity where one or more betting lines have been modified in view of a currently occurring fixture. Substantial simultaneity may vary in a range of quickest to slowest expected delay, to a moderate delay, or to a longer delay. For at least one implementation, substantial simultaneity occurs within an acceptable delay (as described above).

"User Device" herein refers to a device configured for use by a human being to one or more of communicate, present, process, and store data. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Fixture Specific Model Based Betting System 100

As shown in FIG. 1 and for at least one implementation of the present disclosure, a fixture specific model based betting system ("system") 100, may include: one or more user devices 102, such as a first user device 102(1) and an Nth user device 102(N), with each user device 102 executing a first application 104 which facilitates the placing, monitoring, and the like of real-time on-line bets for one or more activities and/or events; a front end system ("FES") 110; and a back end system ("BES") 118. The FES 110 may include one or more servers and databases including an event pricing server ("EPS") 112 which outputs one or more betting lines, and an EAF simulation server ("EAFSS") 300 which provides event-activity-fixture ("EAF") probabilities data ("EAFPD") 138 to the EPS 112. The BES 118 may include one or more servers and database including at least one "other" back-end processing server 120 ("OBPS") providing "other" data 140 to the FES 110; a fixture specific model server ("FSMS") 200 providing fixture specific model leveled data ("FSMLD") 136; and an FSML database ("FSMLDB") 130 storing the one or more FSMLD 136 received from the FSMS 200 and providing FSMLD 136 to the EAFSS 300. The system 100 may further include one or more real-time event data servers ("RTEDS") 114 providing real time EAF data ("RTEAFD") 132 to the FES 110 and BES 118; and an event-activity-fixture database ("EAFDB") 116 storing fixture data and other data regarding past EAF outcomes and providing historical EAF data ("HEAFD") 134. Other servers, databases, communications components and the like may be used in implementations of the system 100.

For at least one implementation, the features and functions of the OBEPS 120 is beyond the scope of the present implementation but may include, for example and not by limitations, servers which facilitate the providing of PROPs data and single line pricing data, for a given bet, to the FES 110, the processing and accounting of betting line results and the like.

The system 100 may be configured to facilitate operations executed by the FES 110 using one or more FSMs obtained from the FSMLDB 130, and one or more of fixture data, market price data, and/or other data provided by the RTEDS 114 and/or other data server and/or other betting line data provided by the OBEPS 120. As shown, the elements of the system may be suitably coupled with each bold arrow indicative of one or more couplings thereof.

User Device 102

For at least one implementation, the system 100 may include one or more user devices 102. A user device 102 may include one or more device components including, but not limited to, a processor, a data store, a user interface, a communications interface, a power supply, a security component, and other components. The one or more components may be provided with the user device 102 or elsewhere; e.g., a remote data store accessible to the device by one or more couplings may be used.

The user device 102 may be configured to execute a first application 104. For at least one implementation, the first application 104 may be an online gaming application which facilitates a user's review, selection and input of one or more on-line bets (e.g., an SGP bet), wherein pricing models for a given on-line bet are adjusted real-time by the EPS 112 based upon fixture data provided by the RTEDS 114 and using probabilities generated by the EAFSS 300 based on one or FSMs selected by the simulation server in view of real-time fixture data provided by the RTEDS 114. For at least one implementation, the first application may be configured to present betting lines where the probabilities have been aligned or not aligned based on fixture data. The first application 104 may provide the user with an option to utilize one or pricing models that are static (e.g., do not change during an event), periodically updated (e.g., when a given activity begins and ends), and/or real-time updated (e.g., as fixture data becomes available to the system 100 for a given activity).

For a non-limiting example, an event may be a given currently occurring or future occurring NFL™ game, e.g., the New England Patriots vs the Kansas City Chiefs. A first betting option for a player activity for the event may be a final score, a winner, a loser, or the like. A second betting option for an activity for the event may be a participant performance metric for one or more players (e.g., a quarterback passing for over three hundred (300) yards). A third betting option may be for an activity that updated real-time based on fixture data and one or more FSMs selected by the EAFSS 300.

FSMS 200

Figure 2:
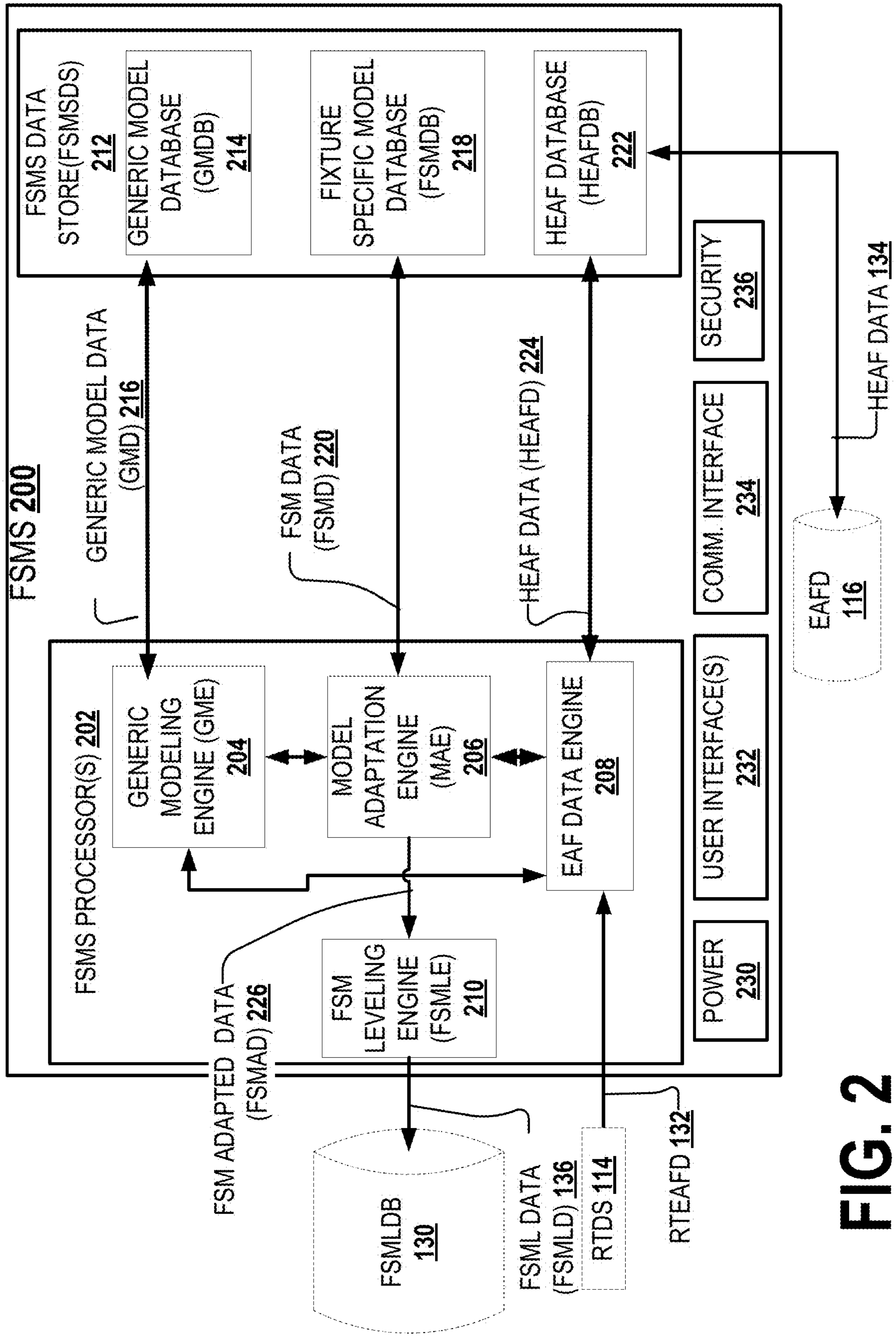
FIG. 2 is a schematic for a model training server utilized in the system of FIG. 1 and in accordance with at least one implementation of the present disclosure.

As shown in FIG. 2, an FSMS 200 may include an FSMS processor 202 which executes non-transient computer instructions, stored in an FSMS data store ("FSMDS") 212, for executing applications, instantiating one more computer engines, and performing other device-related operations. The computer engines instruct the FSMS 200 and/or other system 100 components to perform various operations which facilitate (among other operations) generation, processing, communication, storage (in the FSMLDB 130), and the like of FSMLD 136. Communication of data between an FSMS 200 and another system 100 component may utilize a communications interface 234 that respectively couples the FSMS 200 with the other system component(s). The FSMS 200 may further include one or more user interfaces 232, power 230, security 236, and other commonly utilized components for one or more computers and/or computer servers. The server components may be communicatively coupled by a bus (not shown).

For at least one implementation, the FSMS 200 may be configured to generate FSMLD 136 by executing computer instructions which instantiate one or more computer engines. For at least one implementation, first computer instructions may instantiate a model adaptation engine ("MAE") 206, second computer instructions may instantiate a generic modeling engine ("GME") 204, third computer instructions may instantiate an EAF data engine ("EAFDE") 208, and fourth computer instructions may instantiate an FSM leveling engine ("FSMLE") 210.

Generic Modeling Engine (GME) 204

For at least one implementation, the GME 204 may be configured to perform one or more GME operations ("GMEO") including: generating and/or obtaining (when previously generated), from a generic model database ("GMDB") 214 maintained by the FSMSDS 212, a generic model (as represented by generic model data ("GMD") 216) for a given event and a given activity. For a non-limiting example, the GMD 216 generically provides a generic model useful in determining probabilities for an outcome of a given activity (e.g., an offensive play) for a given event (e.g., an NFL game) based on one or more generic elements of the activity (e.g., the play is occurring on a third down with more than four yards to gain, with the offensive team trailing in the game, which is in the fourth quarter of the event) and one or more generic elements of the event (e.g., the event being an NFL game versus a college football or other game). For at least one implementation, fixture specific data for the activity, such as the predilections of the offensive team to run or pass, the predilections of the defensive team to stop the run or pass by the offensive team, the players (for either team) then on the field, and the like are not included in the GMD 216.

For at least one implementation, the GMD 216 provided in the GMDB 214 may include data for multiple models. The multiple models may be obtained and/or generated, by the GME 204, based on one or more event and/or activity identifiers. For a non-limiting example, aggregate outcomes across a league (e.g., the NFL) and/or other data may include generic event (NFL game) and generic activity (final resolution of the NFL game) identifiers. The generation and population of generic models is well known in the art. The GME 204 may use machine learning and artificial intelligence processes to obtain (from storage) and/or populate generic models and update/refine generic models based upon results in other later arising events and/or activities therein. The generic models may be stored for later use in the GMDB 214.

For at least one implementation, the GME 204 may utilize a supervised AI model that has been trained based on past instance of a given event and activity pairing (e.g., past NFL games and final results thereof). The AI model may be refined based on future event-activity pairings. The GME 204 may be further instructed to use the AI model to find (on the Cloud or otherwise) and review similar events and activities and thereby further refine the model and discover one or more relationships between a given event-activity pairing and a predicted result. As used herein, a given event, activity, or event-activity pairing is "similar" when one or more of the event or activity arise in a given field of endeavor. For a non-limiting example, a women's Olympic soccer game (an event) penalty kick (an activity) is similar to a men's Olympic soccer game as they both arise in a given field of endeavor (soccer). Such relationships may be utilized in generating, obtaining and/or refining current and/or future generic models. For a non-limiting example, the GME 204 may be configured to analyze past NFL games and determine, using machine learning, based upon numerous past instances thereof, that NFL teams rarely initiate an onside kick off unless they are trailing and less than one minute is remaining in the contest. Based on such machine learning, the GME 204 may generate numerous generic models that are representative of how a given collection of a players (or teams) may perform, taken together or otherwise, for a given event-activity pairing. It is to be appreciated that how players respond to a given event-activity pairing often changes over time. Accordingly, the GME 204 may be configured to refine one or more of the generic models, and the corresponding GMD 216 generated, based upon past player responses (as represented by HEAF data 134) and/or in view of RTEAFD 132 received from the RTEDS 114. Generic models so refined may be stored in the GMDB 214 for later use.

For at least one implementation, the GME 204 may be configured to request GMD 216 based upon one or more HEAFD 224 obtained from a HEAF database ("HEAFDB") 222 maintained by the FSMSDS 212 and/or RTEAFD 132 received from the RTEDS 114. For at least one implementation, the GME 204 may request a GMD 216 based upon a possible future arising fixture in a given event and activity wherein the possible future arising fixture is indicated by RTEAFD 132 received from the RTEDS 114 prior to and/or during an occurrence of a given event and/or a given activity during the given event. For example, during a football game in which a punt return is fumbled on a given yard line and recovered by the punting team, RTEAFD 132 indicative of the fumble may be provided to the GME 204. The GME 204 may then request GMD 216 for the fumble and recovery condition. The GME 204 may be configured to select GMD 216 for a given generic model, when multiple generic models are available, or a "best-fit" generic model, when a specific model that corresponds to the fumble condition is not available. The best-fit analysis may utilize any known or later arising best-fit selection algorithms.

Model Adaptation Engine (MAE) 206

For at least one implementation, the MAE 206 may be configured to instruct the FSMS to perform one or more MAE operations ("MAEO") including: searching a fixture specific model database ("FSMDB") 218, that may be maintained by the FSMSDS 212, for FSM data ("FSMD") 220 pertinent to a given fixture. The given fixture may be a possible future arising fixture in a given event and for a given activity. For a non-limiting example and with respect to the fumble recovery example discussed above, the MAE 206 may be configured to request FSMD 220 that can be used to modify a generic model, as provided by the GME 204, and further identifies the teams involved, the fumble recovery location, the predilections of the involved teams, and the like. The MAEO may further include: obtaining a generic model, which may be provided by the GME 204; using the FSMD 220 to modify the generic model into one or more adapted fixture specific models (FSMs); and outputting the one or more adapted FSMs as FSM adapted data ("FSMAD") 226. It is to be appreciated that numerous fixture specific models may be generated and output by the MAE 206, as FSMAD 226, with each model varying by one or more elements of a given fixture, as the given fixture may occur (once the offensive teams proceeds with a play following the fumble recovery). For a given NFL play (an activity) and for a given fixture thereof, for at least one implementation, the MAE 206 may be configured to generate more than ten thousand (10,000) fixture specific model permutations, with each fixture specific model being output by the MAE 206 as FSMAD 226.

The MAE 206 may use AI/ML to generic FSMs and populate the FSMDB 218. AI/ML may be further used to update/refine FSMs based upon results in other later arising events and/or activities therein. The MAE 206 may utilize a supervised AI/ML model that is instructed to find and review similar EAFs to find one or more relationships between a given EAF and a predicted result versus an actual result. Based on comparisons of predicted results (as represented in a given FSM) versus actual results (as represented in RTEAFD 132), the MAE 206 AI/ML may be used to refine existing FSMs so that future utilizations of an FSM for a later arising EAF may result in an improved FSM that can be used by the EPS 112 to provide more accurate probabilities of EAF results for future arising betting lines.

EAF Data Engine (EAFDE) 208

For at least one implementation, the EAFDE 208 may instruct the FSMS 200 to perform one or more EAFDE operations ("EAFDEO") including: requesting HEAFD 224 from an HEAFDB 222 maintained by the FSMSDS 212. The HEAFD 224 may include data identifying elements of an EAF that were previously used to generate an FSM. For example, the HEAFD 224 may include data indicative of one or more predispositions for a given player (e.g., a quarterback) for a given team to perform a quarterback sneak for a given down and distance situation. The HEAFD 224 may likewise include data indicative of whether a given opponent is predisposed to stop or not stop a quarterback sneak play by the given player. Such HEAFD 224, as obtained from the HEAFDB 222, may be provided by the EAFDE 208 to the MAE 206 and used by the MAE 206 to generate an FSM for the given EAF and/or refine, alter and/or otherwise modify an existing FSM for the given EAF.

For at least one implementation, the EAFDE 208 may be configured to receive RTEAFD 132 from the RTEDS 114. The EAFDE 208 may be configured to determine whether some or any of the RTEAFD 132 is to be utilized by the GME 204 to select a generic model and/or the MAE 206 to modify an FSM. For example, and continuing with the quarterback sneak non-limiting example, the EAFDE 208 may receive RTEAFD 132 indicative that the defensive team was or was not able to insert various players adapted to stopping a quarterback sneak. Such data may be utilized to modify and more specifically relate an FSM to actual conditions arising during an event.

FSM Leveling Engine (FSMLE) 210

For at least one implementation, the FSMLE 210 instruct the FSMS 200 to perform one or more FSMLE operations ("FSMLEO") including: organizing, classifying, or otherwise arranging in a relational database, or the like, the two or more FSMADs 226 generated by the MAE 206. It is to be appreciated that hundreds of FSMs may relate to a given event, thousands of FSMs may relate to a given event-activity combination, and millions of FSMs may relate to a given EAF. The FSMLE 210 may be configured to identify common characteristics of the various FSMAD 226 received from the MAE 206 and organize such FSMADs 226 as one more instances of FSM leveled data ("FSMLD") 136 for output to the FES 110 and storage in a relational database, such as the FSMLDB 130 so that the EPS 112 may efficiently identify and retrieve FSMLD 136, from the FSMLDB 13, likely to pertain to a given event, and/or an activity likely to occur therein. For at least one implementation, the FSMLE 210 may be configured to "level" multiple instances of FSMAD 226 to arrive at a reduced set (which may include one instance) of FSMLD 136 that provide one or more models specifically tailored to the RTEAFD 132 as/when received by the FSMS 200. As used herein, "level" and "leveling" "leveling" refers to the classification, organization, filtering and/or other processing of two or more sets of FSMAD 226 to arrive at a correlated, reduced, prioritized or other organization of the two or more sets of FSMAD 226 in the FSMLDB 130. Such leveling may be used by the EAFSS 300 when selecting one or more models to utilize for a given simulation and to generate probabilities for use by the EPS 112 in generating and/or updating one or more betting lines on a real time or other basis.

BES 118

For at least one implementation, the system 100 may include a BES 118. The BES 118 may include one or more servers that receive data regarding event activities (e.g., for past, present and/or future activities), compiles and processes such data into one or more event lines, Props, and/or other combinations of events and activities (herein "betting data") and provides the betting data to the FES 110. The FES 110 utilizes the betting data (in whole or in part) to facilitate generation of and pricing for SGPs, align pricing for SGP and single bets, for a given betting line, track event activities in relation to existing SGPS, and otherwise perform bet related processing activities.

EAF Sim Server (EAFSS) 300

Figure 3:
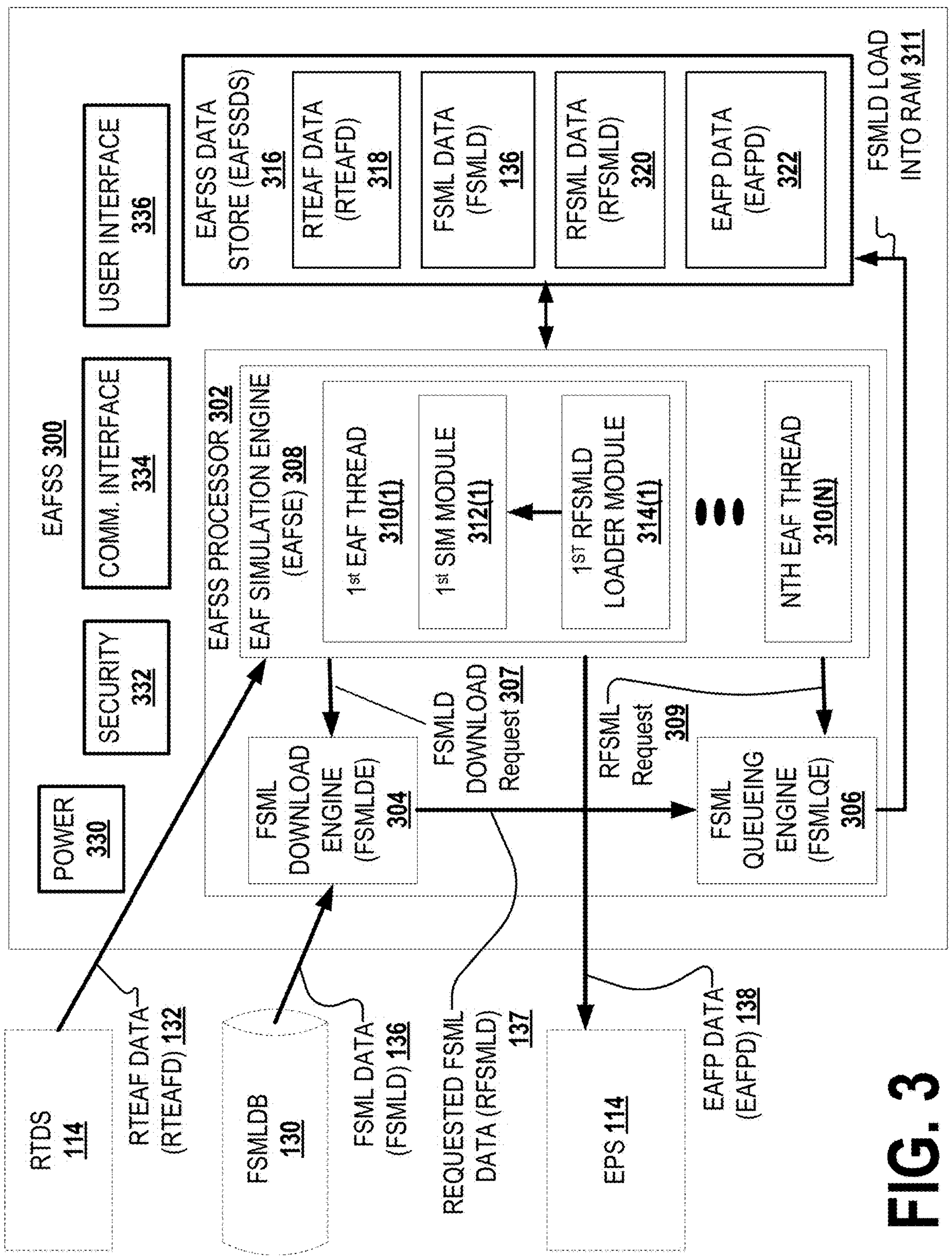
FIG. 3 is a schematic for an event simulation server utilized in the system of FIG. 1 and in accordance with at least one implementation of the present disclosure.

As shown in FIG. 3, an EAFSS 300 may include an EAFSS processor 302 which executes non-transient computer instructions, stored in an EAFSSDS 316 ("EAFSSDS"), for executing applications, instantiating one more computer engines, and performing other device-related operations. The computer engines instruct the EAFSS 300 and/or other system 100 components to perform various operations which facilitate (among other operations) reception, storage, queuing and utilization of FSMLD 136 and the generation of EAFPD 138 that is provided to and used by the EPS 112 to determine pricing for one or betting lines on a substantially real-time basis. Communication of data between an EAFSS 300 and another system 100 component may utilize a communications interface 334 that respectively couples the EAFSS 300 with the other system component(s). The EAFSS 300 may further include one or more user interfaces 336, power 330, security 332, and other commonly utilized components for one or more computers and/or computer servers. The server components may be communicatively coupled by a bus (not shown).

For at least one implementation, the EAFSS 300 may be configured to generate EAFPD 138 by use of multiple computer engines including an FSML download engine ("FSMLDE") 304, an FSML queuing engine ("FSMLQE") 306, and an EAF simulation engine ("EAFSE") 308. An EAFS data store ("EAFSSDS") 316 may be configured to store RETAFD 318, FSMLD 136, and EAFPD 322. Varying levels of data access rates and characteristics may be provided by the EAFSSDS 316 such that data relevant to a determination of a given EAFP may occur on a real time basis.

FSML Download Engine (FSMLDE) 304

For at least one implementation, the FSMLDE 304 may be configured to receive messages from the FSMLDB 130 indicative of when new FSML data 136 has been stored in the FSMLDB 130 and is available for use by the EAFSS 300. The FSMLDE 304 may be further configured to retrieve the new FSMLD 136 from the FSMLDB 130 and store the retrieved data in the EAFSSDS 316. For at least one implementation, the FSMLDE 304 receives an FSMLD download request 307 from the EAFSE 308 to download the new FSML data 136 stored in the FSMLDB 130.

FSML Queueing Engine (FSMLQE) 306

For at least one implementation, the FSMLQE 306 may be configured to designate one or more portions of the FSMLD 136 stored in the EAFSSDS 316 as relevant FSMLD ("RFSMLD") 320. The FSMLQE 306 may be configured to identify FSMLD 136 as RFSMLD 320 based upon an RFSML request 309 ("RFSMLR") received from the EAFSE 308. An FSMLD Load Into RAM message 311 is sent by the FMLQE 306 which instructs the EAFSSDS 316 to load the REFMLD 320 into RAM. As discussed above, the RAM may be provided separately by the EAFSS 300, in conjunction with the EAFSS processor 302, by the EAFSSDS 316, or otherwise such that the RFSMLD 320 may be stored in a data storage location that is readily accessible by the EAFSE 308. Non-limiting examples of such a storage location include cache memory provided with the EAFSS processor 302, and Random Access Memory (RAM) provided by a data storage device that the EAFSS processor 302 can quickly access, wherein "quickly" herein means within less than one milliseconds (1 ms) of a read request initiated by the EAFSE 308.

EAF Simulation Engine (EAFSE) 308

For at least one implementation, the EAFSE 308 may be configured to verify that the RAM includes an RFSMLD 320 and, when present execute multiple substantially simultaneous simulations based a selected RFSMLD 320. The EAFSE 308 may execute multiple threads, such as a first EAF thread 310(1) and an Nth EAF thread 310(N). The threads 310 may be executed by one or more processors that are localized and/or distributed across the Cloud or otherwise. Each thread 310 may be configured to execute an RFSMLD loader module ("RFSMLDL") 314, such as the 1st RFSMLDLM 314(1), and a simulation module 312, such as the 1st simulation module 312(1). The RFSMLDL 314 may be configured to select and load for execution by the simulation module 312 one of the RFSMLs stored in RAM or another data storage device providing "quick" access (as defined immediately above) by the EAFSE 308 to the RFSMLD 320 being utilized for a given then occurring simulation. For at least one implementation the RFSMLDL 314 may be configured to select one of the RESMLS for use based on RTEAFD 132 received by the EAFSE 308 from the RTEDS 114. For at least one implementation, the EAFSE 308 may utilize the multiple threads to execute multiple simulations substantially simultaneously, with each thread executing a given simulation, where the collection of simulations produce results, in a grid, which are indicative of multiple probability of one or more potential outcomes for the given EAF. The probability grid is output as EAF probability ("EAFP") data 138 to the EPS 112. The EPS 112 uses the EAFPD 138 to generate new betting lines and/or update/revise one or more existing betting lines to reflect variations in the RTEAFD 132.

Figure 4:
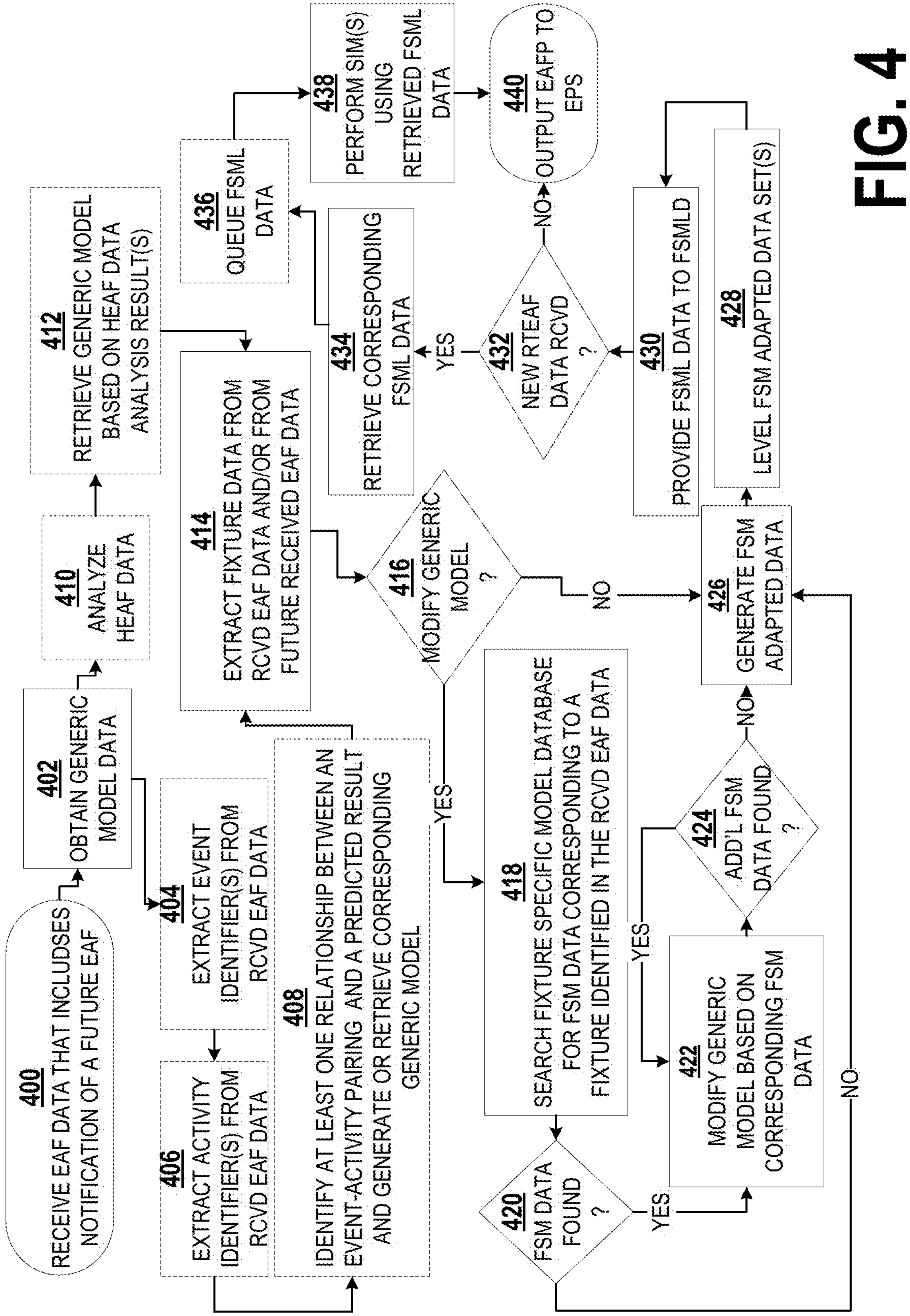
FIG. 4 is a flow chart illustrating a process for generating at least one betting line using fixture specific models and in accordance with at least one implementation of the present disclosure.

As shown in FIG. 4 and for at least one implementation of the present disclosure, a process for generating one or more betting lines using an FSM may include, as per Operation 400, receiving EAF data that includes a notification of a future EAF. For at least one implementation, the EAF data may be received by the FSMS 200. For another implementation, the notification may be received by an FES 110 and communicated to the FSMS 200.

As per Operation 402, the process may include retrieving GMD 216. For at least one implementation, the GMD 216 is obtained by the FSMS 200 from the FSMSDS 212. For another implementation, the generic model data may be obtained by the FSMS 200 from a Cloud based or other database coupled to the FSMS 200. For at least one operation, the obtaining of the generic model data may include one or more of Operations 404-406 and/or Operation 410-412. Upon obtaining one or more instances of generic model data, the process may proceed to Operation 414.

As per Operation 404, the process may include obtaining of the generic model data may include extracting one or more event identifiers from the EAF data. For at least one implementation, the event identifier(s) may be provided at any given level of specification, for example a high level of specification may identify the event as a "basketball game", a second, lower level of specification may identify the "basketball game" as being an NBA™ game, and a third, even lower level of specification, may identify the "basketball game" as being a pre-season, regular season, or post-season baseball game. Any number and/or levels of event identifiers may be used in a given implementation of the present disclosure.

As per Operation 406, the process may include obtaining of the generic model data may include extracting one or more activity identifiers from the EAF data. For at least one implementation, the activity identifier(s) may be provided at any given level of specification, for example a high level of specification may identify the activity as a "shot," and a second, lower level of specification may identify the "shot" as being a three-point shot. Any number and/or levels of activity identifiers may be used in a given implementation of the present disclosure.

As per Operation 408, the process may include identifying at least one relationship between an event-activity pairing and a predicted result and generating (when not available) or retrieving (when available) a corresponding model. For at least one implementation, Operation 408 may be performed by a GME 204 trained using AI/ML.

As per Operations 410-412, the process may include analyzing, in view of the received EAF data, stored HEAF data 134 and retrieving, based on one or more results of the analysis of the stored HEAF data 134, one or more generic models. For a non-limiting example, the received EAF data may indicate that the event-activity pairing is for an NFL football game between two specific teams. Based on an analysis of such data, the system may be configured to identify past pairings of the two specific teams and obtain one or more generic models previously generated and stored in the GMDB 214.

As per Operation 414, the process may include extracting from the received EAF data, and/or from subsequently received EAF data, one or more instances of fixture data.

As per Operation 416, the process may include analyzing the EAF data to determine whether the generic model is to be modified. For at least one implementation, the analyzing of the EAF data may include determining whether fixture data is provided therein that is not captured by the generic model. When the generic model is to be modified, the process proceeds with Operations 418-424. When the generic model is not to be modified, the process proceeds with Operation 426.

As per Operations 418-420, the process may include searching the FSMDB 218 for FSMD 220 corresponding to at least one fixture identified in the received EAF data. When corresponding FSMD 220 is found, the process may proceed to Operations 422-424. When corresponding FSMD 220 is not found, the process may proceed to Operation 426.

As per Operation 422, the process may include modifying the previously retrieved generic model, which was retrieved as per Operations 408 or 412), based on the corresponding FSMD 220 found per Operation 418. For at least one implementation, the modification of the generic model may include specifying in the as modified model one or more fixtures and one or more settings and/or data values associated therewith. For a non-limiting example, a generic model for NFL game (an event) and a goal-line scoring opportunity (an activity) wherein the EAF data identifies a particular offensive team and a particular defensive team, and wherein the FSMD 220 identifies that when a particular player (e.g., a fullback) is in the offensive team huddle, such team has a given probability of scoring a rushing touchdown which is greater than a probability specified for the generic model, the generic model may be modified to reflect the higher probability of rushing touchdown scoring.

As per Operation 424, the process may include determining whether an additional instance of FSMD 220 was found (during Operations 418 and 420) and if so, such additional FSMD 220 may be further utilized to modify the generic model. Returning to the non-limiting rushing touchdown example above, the additional FSMD 220 may indicate, for example, that when a run stopper defensive player is in the game on the defensive team's side, the probability of the offensive team scoring a rushing touchdown decreases and further adjustments to the retrieved generic model may be made to reflect the adjusted probability of the offensive team scoring a rushing touchdown. Operations 422-424 may be repeated for as many instances of FSMD 220 retrieved that correspond to the received EAF data and/or future received EAFD.

As per Operation 426, the process may include generating FSM adapted data. When Operation 426 is reached directly via Operation 416, the generating of the FSM adapted data may occur based on the corresponding generic model obtained via Operation 408 or Operation 412. When Operation 426 is reached via Operation 420, the generating of the FSM adapted data includes a modification of the corresponding generic model, as retrieved per Operations 408 or 412, with one or more elements of one or more fixtures provided in the EAF data received per Operation 400. One or more AI/ML processes may be used to determine which of the one more elements of the one or more fixtures to utilize in generating the FSMAD 226. The AI/ML processes may generate multiple sets of FSMAD 226 when multiple elements of one or more fixtures are specified. The multiple sets may represent multiple combinations of probability grids. When Operation 426 is reached via Operation 424, the generating of the FSMAD 226 may proceed in view of the one or more sets of FSM corresponding data identified per Operations 418-424. It is to be appreciated that one or more sets of FSMAD 226 may be generated per Operation 426.

As per Operation 428, the process may include leveling the two or more sets of FSMAD 226 generated per Operation 426.

As per Operation 430, the process may include providing the FSMLD 136 to the FSMLDB 130 for organization and storage thereof.

As per Operation 432, the process may include a shift of operations to the FES and may include the EAFSS 300 awaiting detection of "new" RTEAF data 132, where "new" here to substantially contemporaneously received RTEAFD 132 that does not correspond to one or more FSMLD 136 sets used to immediately previously generate one or more instance of EAFPD 138 based on one or more past received instances of RTEAFD 132. When new RTEAFD 132 is received, the process may proceed to Operation 434. When new RTEAFD 132 is not received, the process may proceed immediately, after a given number of iterations through Operation 432, after reaching an end of a wait or other timer interval, manually, or otherwise to Operation 440/

As per Operation 434, the process may include retrieving one or more instances of FSMLD 136 that corresponds to the new RTEAF data from the FSMLDB 130.

As per Operation 436, the process may include queuing or otherwise organizing the one or more instances of FSMLD 136 retrieved from the FSMLDB 130 into a queue or other logical structure such that a given one (or more) of the one or more instances of FSMLD 136 may be available for use in one or more simulations to be executed by the EAFSS 300 on a substantially real time or other basis. It is to be appreciated that queuing of the FSMLD 136 may not be needed when use of a given FSMLD 136, in one or more simulations, is to occur substantially simultaneously with a reception of the new RTEAF data (as per Operation 432).

As per Operation 438, the process may include executing one or more simulations using the FSMLD 136 as obtained directly from the FSMLDB 130 or from the queue established (and/or modified) as per Operation 436. As discussed above, the output of the simulation(s) is a probabilities grid, provided as EAFPD 138.

As per Operation 440, the process may end with the outputting of the EAFPD 138 to the EPS 112, which may use the EAFPD 138 to generating and/or modify one or more betting lines. The operations of the EPS 112 are beyond the scope of the present disclosure and any known or later arising operations to generate a betting line based upon probability data provided by one or simulation servers may be utilized in an implementation of the present disclosure.

The operations identified in FIG. 4 are provided herein for illustrative purposes, are not intended to be limiting, and may be performed (if at all) in any order, sequence, combination, permutation, or otherwise as may be applicable to a given implementation of the present disclosure.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A server comprising:

a data store storing non-transitory first computer instructions for instantiating a model adaptation engine ("MAE");

a processor configured to execute the first computer instructions and instantiate the MAE;

wherein the MAE, when instantiated by the processor, instructs the server to perform MAE operations ("MAEO") including:

searching a database for fixture specific model ("FSM") data ("FSMD") pertinent to a given event-activity-fixture ("EAF");

obtaining, from a generic model database ("GMDB"), generic model data ("GMD") for a given event-activity pairing; and modifying the GMD with the FSMD to generate FSM adapted data ("FSMAD") for the given EAF; and an FSMS bus coupling the processor with the data store;

wherein the GMD includes at least one non-transitory generic model identifiable based on both an event identifier and an activity identifier; and wherein the at least one non-transitory generic model has been initially trained, using supervised artificial intelligence and machine learning ("AI/ML"), based on past instances of an event-activity pairing;

wherein the at least one non-transitory generic model has been refined based on additional event-activity pairings; and wherein a generic modeling engine ("GME"), instantiated by the processor, performs GME operations ("GMEO") including:

utilizing the at least one non-transitory generic model to identify, on a Cloud storage device, data pertinent to one or more event-activity pairings that are substantially similar to the given event-activity pairing.

2. The server of claim 1, wherein the GME, when instantiated by the processor, further instruct the server to perform GMEOs including:

obtaining the GMD from a generic model database ("GMDB").

3. The server of claim 2, wherein the GMEO further include:

receiving historical event-activity-fixture data ("HEAFD") from historical EAF database ("HEAFDB") and real-time EAF data ("RTEAFD") from a real-time EAF database ("RTEAFDB"); and further obtaining the at least one non-transitory generic model based on the HEAFD and the RTEAFD.

4. The server of claim 3, wherein the data store further stores non-transitory third computer instructions for instantiating an EAF data engine ("EAFDE");

wherein the processor is further configured to execute the third computer instructions and instantiate the EAFDE;

wherein the EAFDE, when instantiated by the processor, instructs the server to perform EAFDE operations ("EAFDEO") including:

requesting the HEAFD from the HEAFDB;

receiving the RTEAFD from a real-time data server ("RTDS"); and providing both the HEAFD and the RTEAFD to the MAE.

5. The server of claim 4, wherein the data store further stores non-transitory fourth computer instructions for instantiating an FSM leveling engine ("FSMLE");

wherein the processor is further configured to execute the fourth computer instructions and instantiate the FSMLE;

wherein the FSMLE, when instantiated by the processor, instructs the server to perform FSMLE operations ("FSMLEO") including:

receiving the FSMAD from the MAE;

leveling the FSMAD received from the MAE in a relational database; and outputting leveled FSM data ("FSMLD") for storage in an FSM level database ("FSMLDB").

6. The server of claim 5, wherein the FSMLD stored in the FSMLDB is utilized by a simulation server during a real time EAF to simulate one or more outcomes of the real-time EAF; and wherein the one or more outcomes are utilized by an EAF pricing server to determine one or more betting lines for the event.

7. A process for generating a fixture specific model ("FSM") comprising:

searching a database for FSM data ("FSMD") pertinent to a given event-activity-fixture ("EAF");

obtaining, from a generic model database, generic model data ("GMD") for a given event-activity pairing; and modifying the GMD with the FSMD to generate FSM adapted data ("FSMAD") for the given EAF;

wherein the GMD includes at least one non-transitory generic model identifiable based on both an event identifier and an activity identifier; and wherein the at least one non-transitory generic model has been initially trained, using supervised artificial intelligence and machine learning ("AI/ML"), based on past instances of an event-activity pairing;

wherein the at least one non-transitory generic model has been refined based on additional event-activity pairings; and wherein a generic modeling engine ("GME"), instantiated by the processor, performs GME operations ("GMEO") including:

utilizing the at least one non-transitory generic model to identify, on a Cloud storage device, data pertinent to one or more event-activity pairings that are substantially similar to the given event-activity pairing.

8. The process of claim 7, further comprising:

receiving event-activity-fixture data ("EAFD") from at least one of a historical EAF database ("HEAFDB") and a real-time EAF database ("EAFDB"); and further obtaining the generic model based on HEAF data ("HEAFD") received from at least one of the HEAFDB and RTEAF data ("RTEAFD") received from the EAFDB.

9. The process of claim 8, further comprising:

requesting the HEAFD from the HEAFDB; and receiving the RTEAFD from a real-time data server ("RTDS").

10. The process of claim 9, further comprising:

leveling the FSMAD in a relational database; and outputting leveled FSM data ("FSMLD") for storage in an FSM level database ("FSMLDB").

11. The process of claim 10, wherein the FSMLD stored in the FSMLDB is utilized by a simulation server during a real time EAF to simulate one or more outcomes of the real-time EAF; and wherein the one or more outcomes are utilized by an EAF pricing server to determine one or more betting lines for the event.

12. A computer readable medium non-transiently storing non-transitory first computer instructions which when executed by a processor, in a server, instantiates a model adaptation engine ("MAE") that instructs the server to perform MAE operations ("MAEO") including:

searching a database for fixture specific model ("FSM") data ("FSMD") pertinent to a given event-activity-fixture ("EAF");

obtaining generic model data ("GMD") for a given event-activity pairing; and modifying the GMD with the FSMD to generate FSM adapted data ("FSMAD") for the given EAF;

wherein the computer readable medium further stores non-transitory second computer instructions which, when executed by the processor, instantiates a generic modeling engine ("GME") which instructs the server to perform GME operations ("GMEO") including:

obtaining the GMD from a generic model database ("GMDB"); and wherein the GMDB includes non-transitory generic models identifiable based on both an event identifier and an activity identifier; and wherein at least one of the generic models has been refined using a supervised artificial intelligence and machine learning ("AI/ML");

wherein the AI/ML has been initially trained based on past instances of an event- activity pairing;

wherein the AI/ML has been refined based on additional event-activity pairings; and wherein the GME further performs the GMEO of obtaining the GMD from the GMDB by utilizing the AI/ML to identify, on a Cloud storage device, data pertinent to one or more event-activity pairings that are substantially similar to the given event-activity pairing.

13. The computer readable medium of claim 12, wherein the computer readable medium further stores non-transitory third computer instructions which, when executed by the processor, instantiates an EAF data engine ("EAFDE") which instructs the server to perform EAFDE operations ("EAFDEO") including:

providing event-activity-fixture data ("EAFD") to the MAE; and wherein the EAFD is obtained from at least one of a historical EAF database ("HEAFDB") and an EAF database ("EAFDB").

14. The computer readable medium of claim 13, wherein the computer readable medium further stores non-transitory fourth computer instructions which, when executed by the processor, instantiates an FSM leveling engine ("FSMLE") which instructs the server to perform FSMLE operations ("FSMLEO") including:

receiving the FSMAD from the MAE;

leveling the FSMAD received from the MAE in a relational database; and outputting leveled FSM data ("FSMLD") for storage in an FSM level database ("FSMLDB");

wherein the FSMLD is utilized by a simulation server during a real time EAF to simulate one or more outcomes of the real-time EAF; and wherein the one or more outcomes are utilized by an EAF pricing server to determine one or more betting lines for the event.

* * * * *